W. L. WALKER.
COUPLING.
APPLICATION FILED JAN. 9, 1917.
1,284,163.
Patented Nov. 5, 1918.
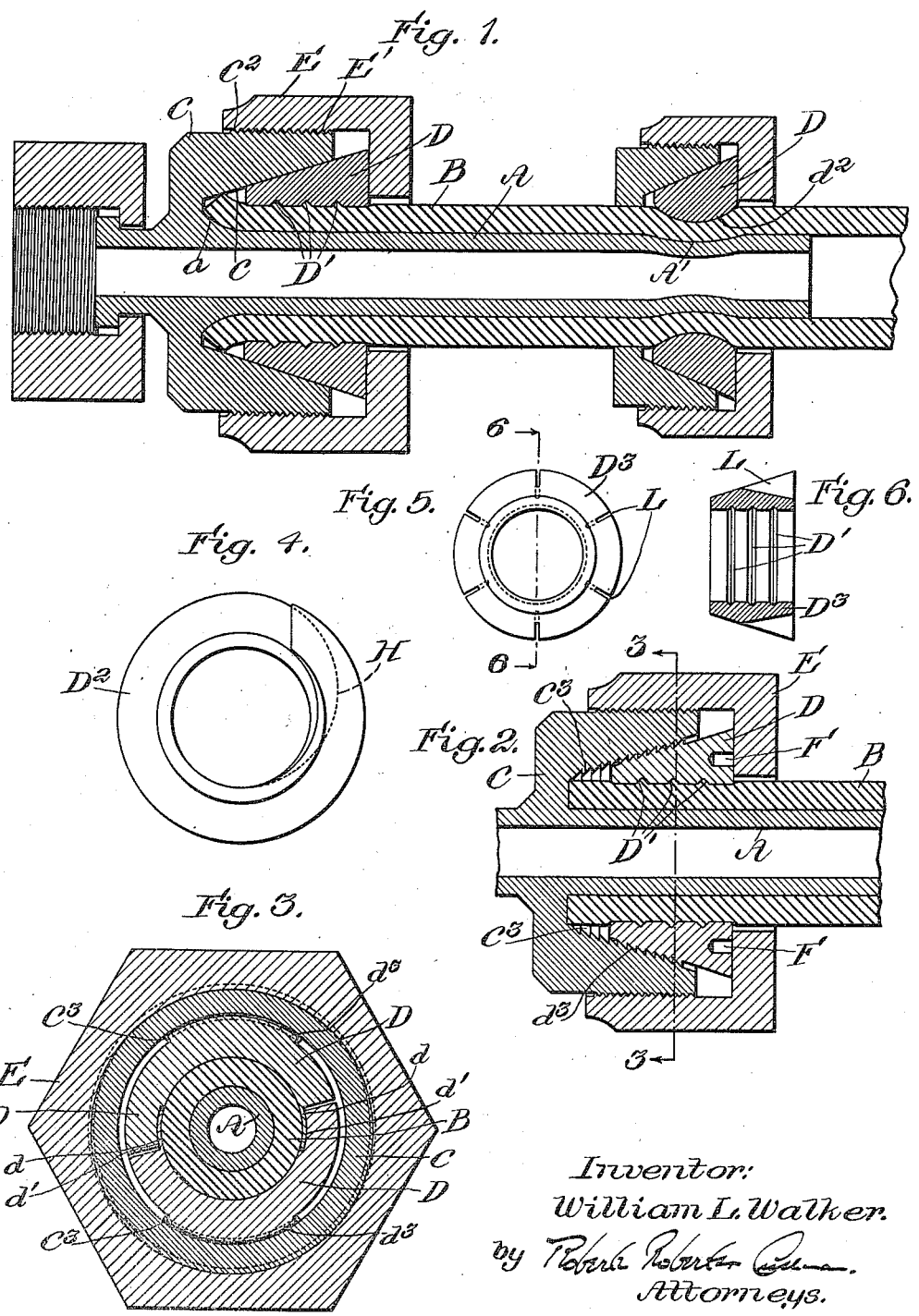
Inventor:
William L. Walker.
by Robert Roberts Cushman
Attorneys.

UNITED STATES PATENT OFFICE.

WILLIAM L. WALKER, OF NEW YORK, N. Y.

COUPLING.

1,284,163.

Specification of Letters Patent.  Patented Nov. 5, 1918.

Application filed January 9, 1917. Serial No. 141,456.

*To all whom it may concern:*

Be it known that I, WILLIAM L. WALKER, a citizen of the United States, and resident of New York, in the county of New York and State of New York, have invented new and useful Improvements in Couplings, of which the following is a specification.

This invention relates to couplings, and more particularly to couplings for diving and pneumatic hose, and its object is to provide a coupling which can be securely attached to the hose eliminating or rendering negligible the escape of air therefrom.

In the accompanying drawings which illustrate certain embodiments of the invention,—

Figure 1 is a transverse sectional view of my improved coupling;

Fig. 2 is a similar view of a modified form;

Fig. 3 is a section on the line 3—3 Fig. 2;

Fig. 4 is a bottom plan view of an alternative form of clamping ring;

Fig. 5 is a similar view of another alternative form of ring;

Fig. 6 is a section on the line 6—6 Fig. 5.

A is a nipple adapted to be inserted into the hose B and provided with an integral head C which has an inclined or beveled inner face C', the said head being spaced apart from said nipple to form therewith a cup-like aperture. Preferably the nipple A is thickened or enlarged at its juncture with the head C to provide a curved surface adapted to turn the end of the hose outward as clearly shown in Fig. 1.

D is a compressible clamping ring wedge-shaped in cross section, and in the preferred form of my invention shown in Figs. 1, 2 and 3, is made in two sections, each section having a lip $d$ at one end and a groove $d'$ at the other end as best shown in Fig. 3, the lip of one section adapted to fit within the groove of the other section when the ring is compressed, as clearly shown in said figure.

The bevel upon the outer face of the ring D corresponds to the inner face C' of the head C, and the inner face of said ring is preferably provided with hose gripping corrugations D'. E is a nut having screw threads E' to coöperate with the screw threads $C^2$ upon the head C.

In use, after the nipple A has been inserted into the hose, the clamping ring D is placed in engagement with the hose within the cup-like aperture between the nipple and head. The nut E is then tightened causing the clamping ring to grip the hose and then to carry it forward toward the head C, the two sections of the ring gradually closing as the nut is tightened firmly wedging the hose within the coupling and forming a joint which is substantially air tight.

In the form of my invention shown in Figs. 2 and 3, the inner bevel face C' of the head C is provided with oppositely disposed zones having annular corrugations $C^3$ and each section of the ring D has complemental corrugations $d^3$ on its periphery adapted to coöperate with the corrugations $C^3$ to lock the ring and head when the ring is forced into clamping position by the nut E, as above described. It will be apparent that if the nut E is accidentally loosened, or gradually works loose in service, the locking corrugations $C^3$ and $d^3$, hold the ring in clamping position within the head thus preventing any leakage of air which might otherwise result from the slipping of the ring. Spanner holes F are provided in the ring so that upon the removal of the nut E the locking corrugations $C^3$ and $d^3$ may be disengaged and the ring removed by a half turn of the ring.

In Fig. 4 there is shown an alternative form of clamping ring $D^2$ which, like the form already described, is wedge-shaped in cross section but instead of being made in independent sections, has a helical slit or cut H which permits it to compress when forced into clamping position by the nut E in the manner above described.

The clamping ring $D^3$ shown in Figs. 5 and 6 is made of lead or other metal capable of flowing under pressure, and is provided with a plurality of marginal slits or cuts L. When this ring in engagement with the hose is forced into the cup-like aperture formed by the head and nipple in the manner already described, the pressure incident to the tightening of the nut E gradually closes the cuts L as the ring is forced into position, thus providing a lead packing firmly to clamp the hose and prevent leakage of air.

Under some conditions of service it may be desirable to provide the nipple A with a depression or pocket A' as shown at the right in Fig. 1, and to employ a locking ring having a convex inner face $d^2$ so that when in clamping position the hose is forced into the pocket A' and firmly held.

A hose coupling constructed in accordance with my invention as above described is simple and durable and provides efficient means not only for securely uniting the hose and coupling, but also for preventing the escape of air or render it negligible.

I claim:

1. A hose coupling comprising a nipple, a head, a compressible clamping member adapted to be forced into hose clamping position between said nipple and said head, means to force said member into clamping position, and means independent of said forcing means to lock said member in clamping position.

2. A hose coupling comprising a nipple, a head, a compressible clamping member adapted to be forced into hose clamping position between said nipple and said head, means to force said member into clamping position and complemental locking means on said head and member to lock said member in clamping position.

3. A hose coupling comprising a nipple, a head, a compressible clamping member adapted to be forced into hose clamping position between said nipple and said head, means to force said member into clamping position, oppositely disposed complemental locking means on said head and member adapted to lock said member in clamping position and to be unlocked by a partial revolution of said head and member.

4. A hose coupling comprising a nipple, a head fast on said nipple and having a beveled inner face, a compressible clamping ring wedge-shaped in cross section adapted to be forced into hose clamping position between said head and nipple, said ring having gripping means on its hose engaging face and formed in sections, each section having on its opposite ends a lip and a groove, the lip of one section adapted to fit within the groove of another section when the ring is compressed, and a nut threaded on said head adapted to force said ring into clamping position.

5. A hose coupling comprising a nipple, a head having a beveled inner face, a compressible clamping ring wedge-shaped in cross section adapted to be forced into hose clamping position between said head and nipple, said ring having gripping means on its hose engaging face and formed in sections, each section having on its opposite ends a lip and a groove, the lip of one section adapted to fit within the groove of another section when the ring is compressed, a nut threaded on said head adapted to force said ring into clamping position, and complemental locking means on said ring and head to lock said ring in clamping position.

Signed by me at Boston, Massachusetts, this 15th day of December, 1916.

WILLIAM L. WALKER.